US007044622B2

(12) United States Patent
Marshall

(10) Patent No.: US 7,044,622 B2
(45) Date of Patent: May 16, 2006

(54) APPARATUS FOR PROJECTING A LIGHT BEAM THROUGH A TRANSPARENT STRUCTURE

(75) Inventor: Forrest A. Marshall, Dublin, GA (US)

(73) Assignee: Marshall Research, Dublin, GA (US)

(*) Notice: Subject to any disclaimer, the term of this patent is extended or adjusted under 35 U.S.C. 154(b) by 201 days.

(21) Appl. No.: 10/808,842

(22) Filed: Mar. 25, 2004

(65) Prior Publication Data

US 2004/0190293 A1 Sep. 30, 2004

Related U.S. Application Data

(60) Provisional application No. 60/528,075, filed on Dec. 9, 2003, provisional application No. 60/472,629, filed on May 22, 2003, provisional application No. 60/459,139, filed on Mar. 31, 2003.

(51) Int. Cl.
*F21V 21/00* (2006.01)
*F16B 47/00* (2006.01)

(52) U.S. Cl. ...................... 362/397; 362/191; 362/233; 248/205.5

(58) Field of Classification Search ................ 362/191, 362/396–397, 253, 233; 248/205.5–205, 248/309.3–309, 683
See application file for complete search history.

(56) References Cited

U.S. PATENT DOCUMENTS

| | | | | | |
|---|---|---|---|---|---|
| 1,714,422 | A | * | 5/1929 | Hanson | 248/205.9 |
| 1,767,373 | A | * | 6/1930 | Kirlin | 362/397 |
| 2,264,477 | A | * | 12/1941 | Loeffler | 248/205.5 |
| 5,303,132 | A | * | 4/1994 | Lowder | 362/138 |
| 5,673,989 | A | * | 10/1997 | Gohl et al. | 362/35 |
| 6,876,897 | B1 | * | 4/2005 | Gillen et al. | 700/114 |

* cited by examiner

*Primary Examiner*—Ali Alavi
(74) *Attorney, Agent, or Firm*—Patent Focus, Inc.

(57) ABSTRACT

An illumination tool for projecting a light beam through a transparent structure that has a portion of the tool detachably securable via a vacuum seal mechanism that engages the transparent structure. A lighting mechanism is electrically attached to the illumination tool and is positioned in contact with the transparent structure via a soft seal positioned about the lighting mechanism. The lighting mechanism may, if desired, be manually activated and deactivated i.e., the illumination tool turned on or off. If desired, the illumination tool may be remotely operated by a user depressing a remote operating switch and a radio signal is communicated to the illumination tool. The remote actuator may also be hardwire connected to the illumination tool. Further, if desired the lighting mechanism may be illuminated via strobe light, a continuous or flashing beam of light.

25 Claims, 3 Drawing Sheets

APPARATUS FOR PROJECTING A LIGHT BEAM THROUGH A TRANSPARENT STRUCTURE

CROSS-REFERENCE TO RELATED APPLICATION

This application Claims the benefit of U.S. Provisional Applications Ser. No. 60/459,139 filed on Mar. 31, 2003, Ser. No. 60/472,629 filed on May 22, 2003 and Ser. No. 60/528,075 filed on Dec. 9, 2003 all of which are incorporated by reference herein.

FIELD OF THE INVENTION

The present invention relates, in general, to an illumination tool. In particular, the present invention relates to an apparatus for projecting a light beam through a transparent structure. The apparatus may be manually operated or remotely controlled by a user.

BACKGROUND OF THE INVENTION

Emergency service personnel i.e., fire, police, medical and vehicle accident responders use emergency lighting. Emergency lighting is primarily designed to focus lighting over a large area. An example of this type of light is a flood light that is positioned relatively close to the area of intended illumination. This type of lighting is ground based or positioned on an elevated stand. This type lighting disperses the light over a wide area. The flood light is focused by physically moving the light beam closer to or farther away distant from the area of intended illumination. If the lighting situation requires illumination inside a confined space that is sheltered from ambient light, focusing the light beam becomes more difficult. The flood light may illuminate the outer surface of the confined space but does little to illuminate the interior of the confined space. An example of a confined space is the interior of a vehicle.

Attempts in the past to resolve the problem of illuminating the interior of confined spaces have involved the use of hand held lighting devices i.e., flashlights. Unfortunately, hand held lighting devices require the user to hold and point the light toward the area of intended illumination. This restricts the user's ability to use both hands to render aid or engage in policing activities. Further, hand held lighting devices are not intended to be positioned in the confined space and user must lay them down on a surface or wedge them by some means in order to use both hands.

It would be desirable to have a hands-free lighting device that could be positioned as a flood light and positioned in confined spaces without requiring the user to physically hold the light stationary. Further, the lighting device would be remotely controlled or directly controlled by the user. The user could, if desired, gang a plurality of lighting devices together and operate them remotely.

SUMMARY OF THE INVENTION

The present invention is an illumination tool for projecting a light beam through a transparent structure. In one embodiment, the present invention has a portion of the illumination tool detachably securable via a vacuum seal mechanism that engages the transparent structure. A lighting mechanism is electrically attached to the illumination tool and is positioned in contact with the transparent structure via a soft seal positioned about the lighting mechanism. The lighting mechanism may, if desired, be manually activated and deactivated i.e., the illumination tool is turned on or off. If desired, the illumination tool may be remotely operated by a user depressing a remote operating switch and a radio signal is communicated to the illumination tool. The remote actuator may also be hardwire connected to the illumination tool. Further, if desired, the lighting mechanism may illuminate via strobe light or continuous beam of light.

In another embodiment of the present invention, a portion of the illumination tool comprising a magnet and power source may be placed in contact with a metal frame that houses the transparent structure. The lighting mechanism of the illumination tool is extended on a flexible cable thereby the user may, selectively position the tool anywhere on the transparent structure or in any selected direction. Like the first embodiment of the present invention, this embodiment may be remotely activated and deactivated.

In another embodiment of the present invention a portion of the illumination tool may, if desired, have the lighting mechanism arcuately rotate to a selected position in a 350-degree arc. As in the first embodiment of the present invention, this embodiment may be remotely activated and deactivated.

BRIEF DESCRIPTION OF THE DRAWINGS

The invention is illustrated in the drawings in which like reference characters designate the same or similar parts throughout the figures of which.

DETAILED DESCRIPTION

Figure 1:
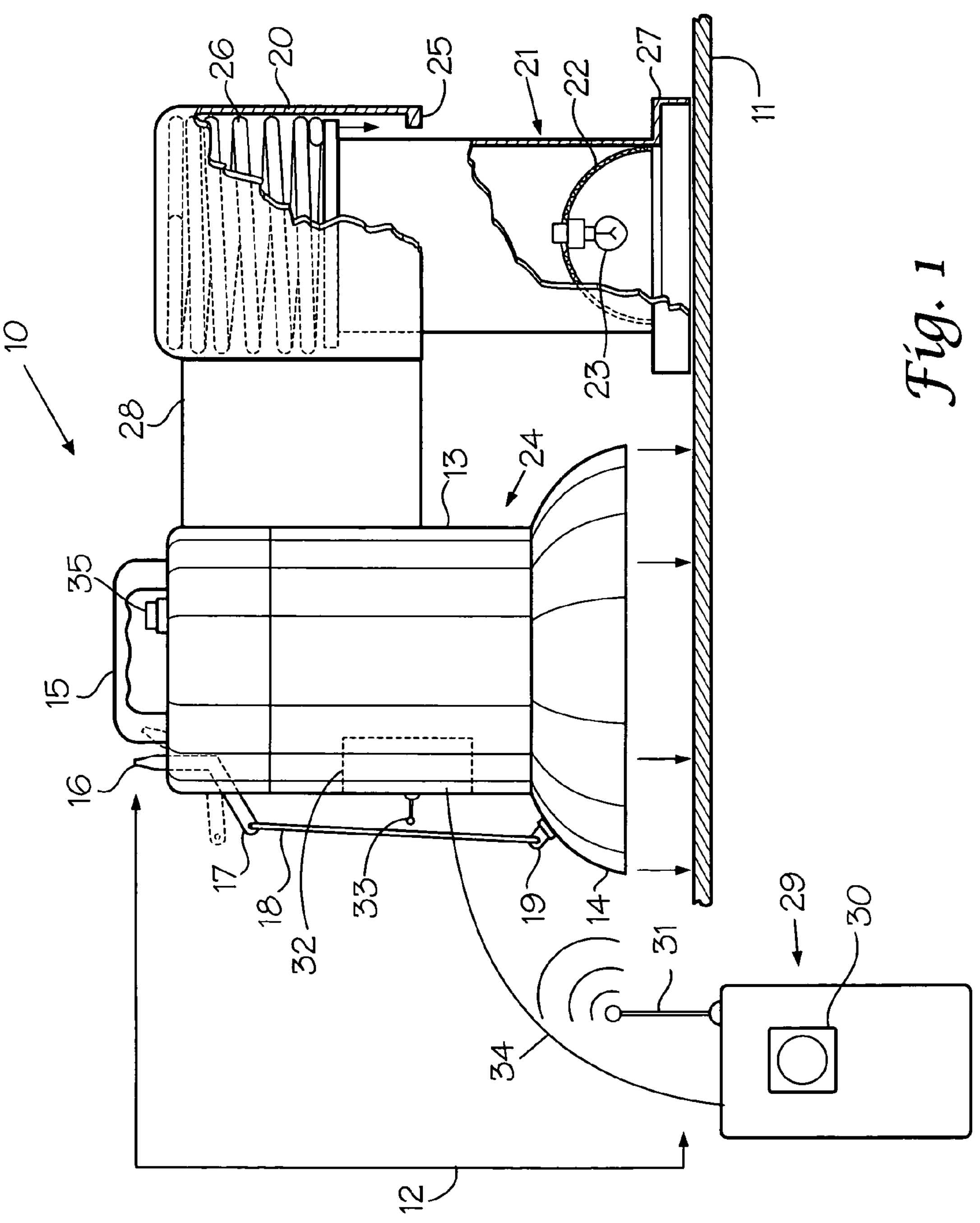
FIG. 1 illustrates a top-level schematic view diagram of the present invention.

Before describing in detail the particular improved illumination tool or apparatus for projecting a light beam through a transparent structure in accordance with the present invention, it should be observed that the invention resides primarily in the novel structural combination of conventional lighting components, discrete subsystems or subassembly components and associated control of the aforementioned conventional lighting components and not in the particular detailed configuration thereof. Accordingly, the lighting components, command, control and arrangement of the present invention have, for the most part, been illustrated in the drawings by readily understandable schematic diagrams. The drawings show only those specific details that are pertinent to the present invention in order not to obscure the disclosure with structural details which will be readily apparent to those skilled in the art having the benefit of the description herein.

The present 10, FIG. 1 may, if desired, be detachably secured to any surface via a vacuum sealable mechanism 12. The vacuum sealable mechanism 12 has a first elongated cylinder 13 with one end dosed. The other end of the first elongated cylinder 13 is connected to a vacuum sealable apparatus 14. The vacuum sealable apparatus 14 may, if desired, be any convenient type of vacuum sealing apparatus. For example, the vacuum apparatus 14 is a pliable material that readily forms to the surface of any transparent surface or window 11. The pliable material may, if desired, be formed into a cup shape, arcuate cup shape or any other geometric shape that may form to the surface the window 11. The closed portion of the first elongated cylinder 13 has a handle 15 mounted thereon for gripping or carrying the present invention 10.

A depressible switch 16, FIG. 1 is mounted onto the first elongated cylinder 13 in proximity to the handle 15. The depressible switch 16 is connected to a lever 17 that provides mechanical advantage to a control rod 18 connected to the vacuum sealable apparatus 14. Pressing down on the depressible switch 16 in concert with the mechanical action of the lever 17, control rod 18 and a one-way valve 19 releases the vacuum disposed on the window 11 via the vacuum sealable apparatus 14 cup shaped portion.

A second elongated cylinder 20, FIG. 1 has one end closed and the other oppositely disposed end is open. A third elongated cylinder 21 has one end closed and the other oppositely spaced end has a lighting mechanism 22 mounted therein. The lighting mechanism 22 has a reflector and a light emitter 23 is connected to the power source 24. The third elongated cylinder's 21 closed end is slidably insertable into the open end of the second elongated cylinder 20. The third elongated cylinder 21 is retained within the confines of the second elongated cylinder 20 by a flange 25. A spring 26 is mounted within the second elongated cylinder 20 and engages the closed end of the third elongated cylinder 21. The spring 26 applies pressure on the third elongated cylinder's 21 closed end thereby forcing the third elongated cylinder 21 to reside against the flange 25. A soft seal 27 may, if desired, be mounted about the open end of the third elongated cylinder 21. The soft seal engages the window 11 thereby reducing the light scatter resulting from the operation of the present invention 10. An elongated member 28 connects the first elongated cylinder 13 and the second elongated cylinder 20 together. The elongated member 28 may, if desired, be any convenient connector that enables the first elongated cylinder 13 to be rigidly connected to the second elongated cylinder 20. The battery or batteries 24 supplying power to the light emitter 23 are housed in the first elongated cylinder 13 and are connected to the second elongated cylinder 20 and light emitter 23 via elongated member 28.

The present invention 10, FIG. 1 may, if desired, be activated via a remotely operated transmitter 29. The remote transmitter 29 has an on/off push-button switch 30. Once the push-button switch 30 is depressed, a signal containing an activation command is transmitted via a first antenna 31 to a receiver 32 mounted within the confines of first elongated cylinder 13. The receiver 32, via a second antenna 33, receives the activation command from the transmitter 29 whereupon the light emitter 23 is activated. Depressing the push-button switch 30 a second time activates the high intensity of the light beam and activates the flash mode of the present invention. Depressing the push-button switch 30 a third deactivates the light emitter 23. The three-position cycle of the transmitter 29 may, if desired, be repeated. If desired, a plurality of light emitters 23 contained in separately mounted present inventions 10 mounted on a plurality of transparent surfaces may be activated via the transmitter 29 simultaneously. A signal conducting wire 34 may, if desired, be connected to the transmitter 29 and receiver 32 to remotely activate the light emitter(s) 23 rather than depressing push-button switch 30.

In operation, the handle 15, FIG. 1 is grasped and the present invention 10 is adjacently spaced to the window 11. The vacuum sealable apparatus 14 engages the window 11 along with the soft seal 27. Pressure is exerted on the handle 15 forcing the vacuum sealable apparatus 14 to attach to the window 11. The vacuum sealable apparatus 14 holds the present invention 10 in-place. A manual Off-On-Bright three position switch 35 is mounted onto the first elongated cylinder 13 in proximity to the handle 15. The manual Off-On-Bright switch 35 is pressed and the lighting mechanism 22 projects a light beam through the transparent structure i.e., the window 11. The manual Off-On-Bright switch 35 is pressed a second time activates the bright mode of the present invention 10. Activating the manual Off-On-Bright three position switch 35 a third time turns the light emitter 23 off. After use, the present invention 10 may, if desired, be disengaged from the window 11 by depressing switch 16 thereby releasing the vacuum of the vacuum sealable apparatus 14. To operate remotely the present invention 10 is adjacently spaced to the window 11 (as discussed herein) and the transmitter 29 activates the light emitter(s) 23 via an activation command.

Figure 2:
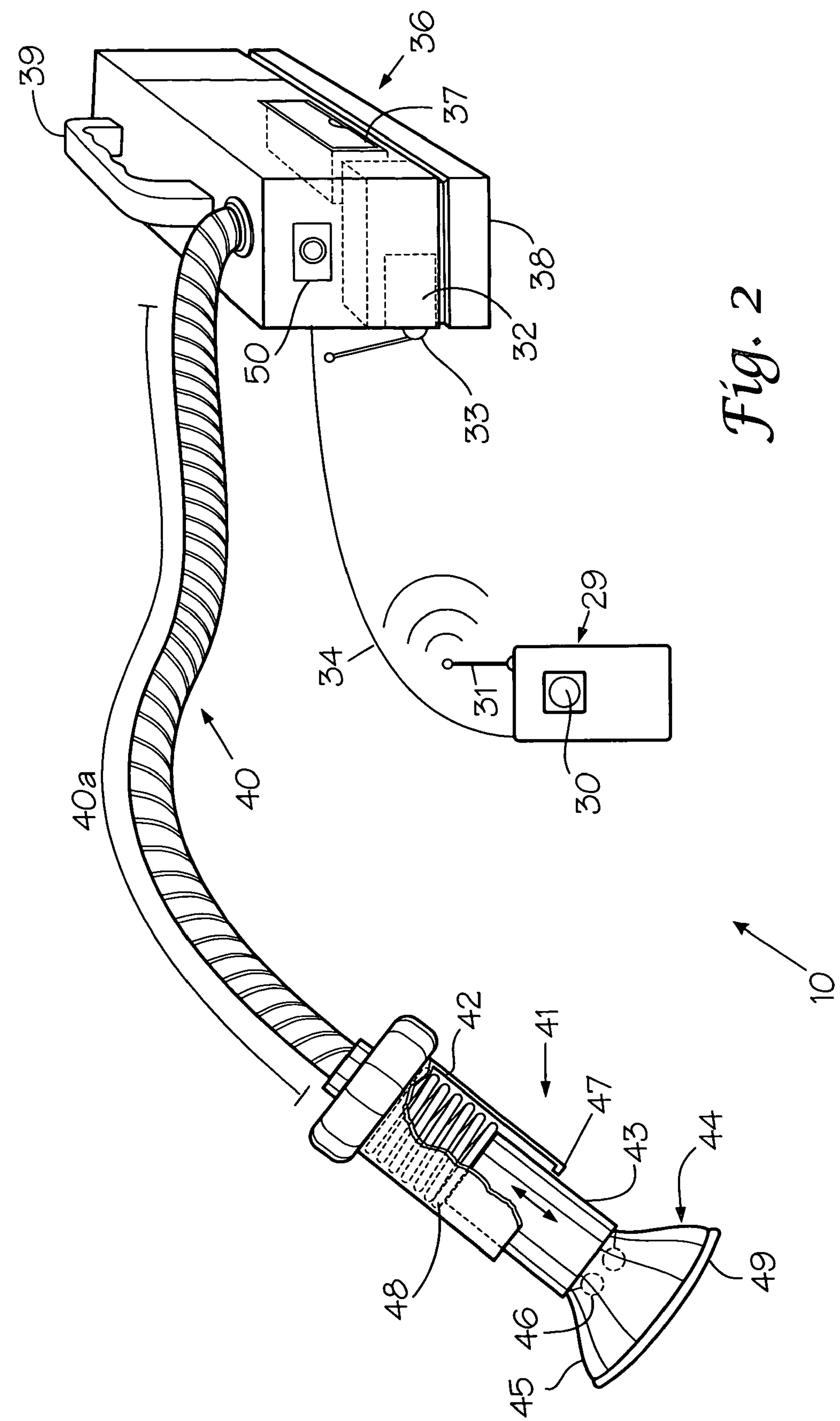
FIG. 2 illustrates a top-level schematic view diagram of a second embodiment the present invention.

A second embodiment of the present invention 10, FIG. 2 is an apparatus to remotely activate a light beam through a transparent structure configured in power source/housing 36, FIG. 2 with an extendable arm 40 attached to a source for the light beam 41. The power source/housing 36 may, if desired, be substantially rectangular with a magnet 38 mounted thereon for connecting the rectangular housing 37 to a metallic surface. An example of a metallic surface is a roof or body of a substantially metallic vehicle.

The power source/housing 36, FIG. 2 has a handle 39 connected thereto for transporting the rectangular housing 37. The extendable arm 40 has one end connected to the rectangular housing 37 in such a way as not to interfere with the handle 39. The other end of the extendable arm 40 is connected to the source for the light beam 41. The extendable arm 40 may, if desired, be moved or directed into a sustainable position and remain in that position indefinitely. For example, the extendable arm 40 is directed by a user into an arcuate position 40*a*. The arcuate position 40*a* remains in that relative position until altered by the user.

The light beam source 41, FIG. 2 comprises a fourth elongated cylinder 42 that has one end closed and the other oppositely disposed end open. A fifth elongated cylinder 43 has one end closed and the other oppositely spaced end has a lighting mechanism 44 mounted therein. The lighting mechanism 44 has a reflector 45 and a light emitter 46 connected to the power source/housing 36 via extendable arm 40. The fifth elongated cylinder's 43 closed end is sidably insertable into the open end of the fourth elongated cylinder 42. The fifth elongated cylinder 43 is retained within the confines of the fourth elongated cylinder 42 by a flange 47. A spring 48 is mounted within the fourth elongated cylinder 42 and engages the closed end of the fifth elongated cylinder 43. The spring 48 applies pressure on the fourth elongated cylinder's 42 closed end thereby forcing the fifth elongated cylinder 43 to reside against the flange 47. A soft seal 49 may, if desired, be mounted about the open end of the fifth elongated cylinder. The soft seal engages the window 11 thereby reducing the light scatter resulting from the operation of the present invention 10.

In operation: The handle 39, FIG. 2 is grasped by the user and the power source/housing 36 is positioned on a metallic surface. The extendable arm 40 is conveniently positioned to direct the lighting mechanism 44 to any convenient position ergo the soft seal 49 engaging a transparent structure. A manual Off-On-High-Bright three position switch 50 operationally connected to the power source/housing 36 controls the lighting mechanism 44.

The second embodiment of the present invention 10 may, if desired, be activated via a remotely operated transmitter 29. The remote transmitter 29 has an Off-On-High-Bright three-position push-button switch 30. Once the push-button switch 30 is depressed, a signal containing an activation command is transmitted via a first antenna 31 to a receiver 32 mounted within the confines of housing 37. The receiver 32, via a second antenna 33, receives the activation command from the transmitter 29 whereupon the lighting mechanism 44 is activated. Depressing the push-button switch 30, a second time deactivates the lighting mechanism 44. If desired, a plurality of lighting mechanisms 44 contained in separately mounted present inventions 10 mounted on a plurality of transparent surfaces may be activated via the transmitter 29 simultaneously. A signal conducting wire 34 may, if desired, be connected to the transmitter 29 and receiver 32 to remotely activate or deactivate the light emitter(s) 46 rather than depressing push-button switch 30.

Figure 3A:
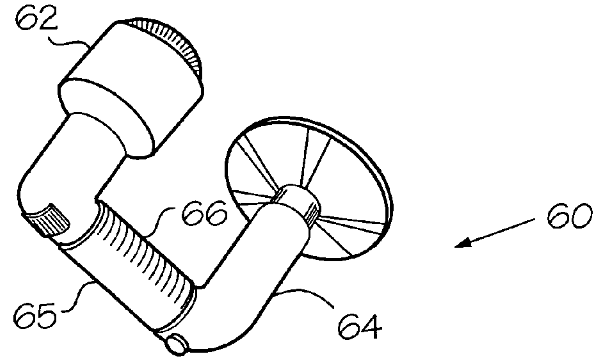
FIG. 3 illustrates a top-level schematic view diagram of a third embodiment of the present invention.
Figure 3B:
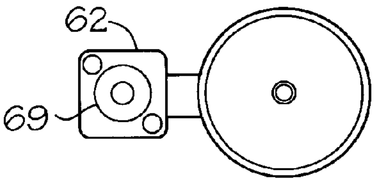
Figure 3C:
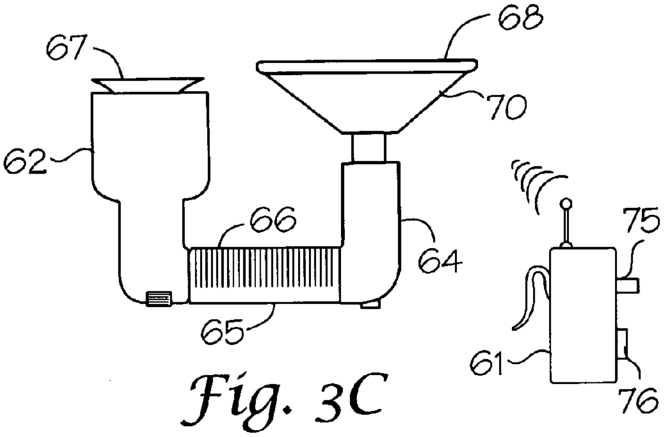
Figure 4:
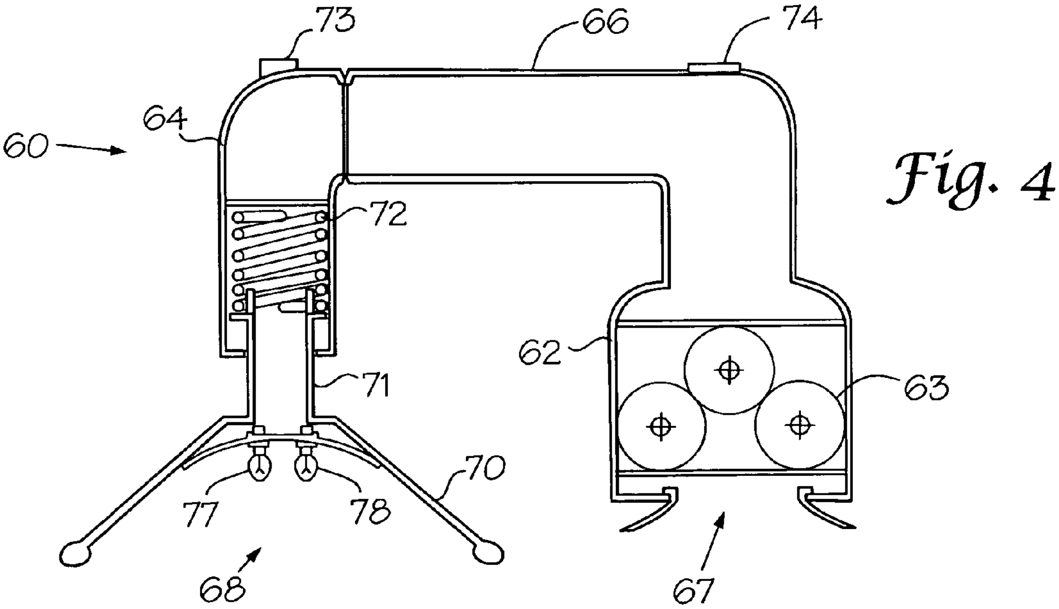
FIG. 4 illustrates a cross-sectional view diagram of the third embodiment of FIG. 3.

A third embodiment of the present invention 10 is a hands-free lighting mechanism 60, FIG. 3. The hands-free lighting mechanism 60 enables the present invention 10 to be attached magnetically to any metal surface and operated remotely by a control switch 61. The hands-free lighting mechanism 60 is a substantially U-shaped member with the batteries 63, FIG. 4 operatively connected in leg 62 and the lighting portion operatively connected in leg 64. The substantially U-shaped member's legs 62 and 64 are connectively joined by the member's section 65. The substantially U-shaped member's section 65 is substantially elongated to function as a handgrip 66.

The end points of the substantially U-shaped member have connected thereon, respectively, a suction cup 67 and a foam member 68, FIG. 3. The suction cup 67 engages a selected metal surface and holds the hands-free lighting mechanism 60 in place while in use. If desired, a magnet 69 is installed in the leg 62 to aid in holding the hands-free lighting mechanism 60 to the selected metal surface. A cone shaped member 70 has a cylindrical portion 71 connected thereto. The cylindrical portion 71 is sidably positioned within the substantially U-shaped member's leg 64 and is urged forward by spring 72. The cone shaped member 70 has connected about the rim foam member 68. When the spring 72 urges the cylindrical member 71 forward the foam member 68 engages the transparent structure. The substantially U-shaped member's leg 64 may, if desired, be rotated to any position within a 350 degree arc permitting alternate viewing angles for the operator of the hands-free lighting mechanism 60.

In operation, the hands-free lighting mechanism 60, FIG. 3 is initially held by the operator by the handgrip 66 and positioned in such a way as to allow the substantially U-shaped member's leg 62 to engage a metal surface. This process allows the substantially U-shaped member's leg 64 to engage the transparent surface via the cone shaped member 70. The hands-free lighting mechanism 60 is activated via a manual on-off switch 73 or remotely by switch 61. The remote switch 61 has an elongated on switch 75 and a foreshortened off switch 76 denoting by feel the activation and deactivation of the hands-free lighting mechanism 60. If desired, the hands-free lighting mechanism 60 may be operated in the continuous light mode via bulb 77 or a strobe light 78 mode. Either mode may, if desired, be activated by the manual switch 73 or remote switch 61. Disengaging the hands-free lighting mechanism 60 via release switch 74 releases the suction of the suction cup 67 engaging the metal surface. A low battery indicator may, if desired, be implemented on the present invention 10 to indicate when two thirds (⅔) of the battery life has been expended.

I claim:

1. An apparatus for projecting a light beam through a transparent structure, comprising:

a) a detachably securable vacuum sealable mechanism engaging the transparent structure's surface;

b) a lighting mechanism in electrical communication with said detachably securable vacuum sealable mechanism;

c) said lighting mechanism engaging the transparent structure's surface via a sealing mechanism; and d) said lighting mechanism projecting the light beam through the transparent structure.

2. An apparatus for projecting a light beam as recited in claim 1 wherein said lighting mechanism is in electrical communication with said detachably securable vacuum sealable mechanism via an elongated supporting member connecting said vacuum sealable mechanism to said lighting mechanism.

3. An apparatus for projecting a light beam as recited in claim 1 wherein said vacuum sealable mechanism is a cup shaped vacuum seal.

4. An apparatus for projecting a light beam as recited in claim 1 wherein said vacuum sealable mechanism is an arcuate shaped vacuum seal.

5. An apparatus for projecting a light beam as recited in claim 1 further comprising:

a) a release mechanism connectively disposed to said vacuum sealable mechanism; and b) said release mechanism causing the release of said lighting mechanism from the transparent structure's surface.

6. An apparatus for projecting a light beam as recited in claim 5 wherein said release mechanism is a lever connectively disposed on said vacuum sealable mechanism, said lever disengaging the vacuum seal thereby disengaging said lighting mechanism from the transparent structure.

7. An apparatus for projecting a light beam as recited in claim 1 wherein said sealing mechanism is a soft seal connectively disposed to said lighting mechanism, said soft seal engaging the transparent structure.

8. An apparatus for projecting a light beam as recited in claim 1 wherein said lighting mechanism emits a strobe light.

9. An apparatus for projecting a light beam as recited in claim 1 wherein said lighting mechanism emits a continuous light.

10. An apparatus for projecting a light beam as recited in claim 1 further comprising:

i) an activation receiver connectively disposed to said lighting mechanism;

j) a remote transmitter in communication with said activation receiver;

k) said remote transmitter controlling said lighting mechanism projecting the light beam through the transparent structure.

11. An apparatus for projecting a light beam as recited in claim 10 wherein said remote transmitter's light activation switch overhangs said remote transmitter's light deactivation switch.

12. An apparatus for projecting a light beam as recited in claim 1 wherein said lighting mechanism and said detachably securable vacuum sealable mechanism in combination form a hands-free lighting mechanism.

13. An apparatus for projecting a light beam as recited in claim 12 further comprising a detachably securable magnetic mechanism operationally disposed within the confines of said detachably securable vacuum sealable mechanism to aid in securing said hands-free lighting mechanism to metal.

14. An apparatus for projecting a light beam as recited in claim 12 wherein said hands-free lighting mechanism is substantially U-shaped.

15. An apparatus for projecting a light beam as recited in claim 14 wherein said substantially U-shaped hands-free lighting mechanism has one leg rotatable about a 350-degree arc.

16. An apparatus for projecting a light beam as recited in claim 15 wherein said substantially U-shaped hands-free lighting mechanism has one leg magnetically coupled to a metal structure.

17. An apparatus for projecting a light beam through a transparent structure wherein the transparent structure is encased in a metal frame, comprising:

a) a detachably securable magnetic mechanism engaging the transparent structure's metal frame;

b) a lighting mechanism in electrical communication with said detachably securable magnetic mechanism;

c) said lighting mechanism engaging the transparent structure's surface via a sealing mechanism; and d) said lighting mechanism projecting the light beam through the transparent structure.

18. An apparatus for projecting a light beam as recited in claim 17 further comprising:

d) an activation receiver connectively disposed to said lighting mechanism;

e) a remote transmitter in communication with said activation receiver via a signal carrying conductor;

f) said remote transmitter controlling said lighting mechanism projecting the light beam through the transparent structure.

19. An apparatus for projecting a light beam as recited in claim 17 further comprising an elongated supporting member connecting said sealing mechanism to said lighting mechanism.

20. An apparatus for projecting a light beam as recited in claim 17 wherein said lighting mechanism emits a strobe light.

21. An apparatus for projecting a light beam as recited in claim 17 wherein said lighting mechanism emits a continuous light.

22. An apparatus for projecting a light beam as recited in claim 17 wherein said sealing mechanism is a cup shaped seal.

23. An apparatus for projecting a light beam as recited in claim 17 wherein said sealing mechanism is an arcuate shaped seal.

24. An apparatus for projecting a light beam through a transparent structure, comprising:

a) a first elongated cylinder having one end closed, said closed end having a handle connectively disposed thereon;

b) a vacuum cup connectively disposed to said first elongated cylinder's other end, said vacuum cup engaging the transparent structure's surface forming a vacuum seal thereon;

c) a second elongated cylinder having one end closed;

d) a third elongated cylinder having one end dosed, said third elongated cylinder sidably insertable into said second elongated cylinder;

e) an elongated supporting member connecting said second elongated cylinder to said third elongated cylinder;

f) a sealing mechanism connectively disposed about said third elongated cylinder's other end, said sealing mechanism engaging the transparent structure;

g) a lighting mechanism connectively disposed within the confines of said third elongated cylinder, said lighting mechanism projecting a light beam through the transparent structure via said sealing mechanism; and h) a vacuum release mechanism connectively disposed to said first elongated cylinder, activating said vacuum release mechanism causing said first elongated cylinder and said third elongated cylinder to disengage the transparent structure's surface.

25. An apparatus for projecting a light beam through a transparent structure, comprising:

a) a magnetically securable housing;

b) a detachably securable sealable lighting mechanism engaging the transparent structure's surface;

c) an elongated extendable arm connecting said lighting mechanism to said housing;

d) said lighting mechanism receiving power from said housing; and e) said lighting mechanism projecting the light beam through the transparent structure.

* * * * *